United States Patent
Arnold

(10) Patent No.: US 7,350,662 B2
(45) Date of Patent: Apr. 1, 2008

(54) MODULAR REUSABLE VEHICLE SHIPPING CRATE

(75) Inventor: W. Craig Arnold, Parkersburg, WV (US)

(73) Assignee: Gatewood Products, LLC, Parkersburg, WV (US)

( * ) Notice: Subject to any disclaimer, the term of this patent is extended or adjusted under 35 U.S.C. 154(b) by 0 days.

(21) Appl. No.: 11/172,860

(22) Filed: Jul. 5, 2005

(65) Prior Publication Data

US 2006/0011625 A1    Jan. 19, 2006

Related U.S. Application Data

(60) Provisional application No. 60/588,046, filed on Jul. 15, 2004.

(51) Int. Cl.
- B65D 6/24 (2006.01)
- B65D 88/52 (2006.01)
- B65D 6/08 (2006.01)

(52) U.S. Cl. .............. 220/6; 220/8; 220/1.5; 220/4.28; 206/335

(58) Field of Classification Search ........ 220/1.5, 220/4.33, 8, 6, 4.28; 206/335; 217/13, 37, 217/45
See application file for complete search history.

(56) References Cited

U.S. PATENT DOCUMENTS

| | | | |
|---|---|---|---|
| 637,061 A * | 11/1899 | Ambrose | 217/45 |
| 2,619,249 A * | 11/1952 | Whittington | 220/8 |
| 3,850,295 A * | 11/1974 | Black | 206/304 |
| 4,805,794 A * | 2/1989 | Tsuchiya et al. | 220/8 |
| 5,143,283 A * | 9/1992 | Lancaster | 229/199 |
| 5,184,743 A * | 2/1993 | Suzuki et al. | 220/1.5 |
| 5,429,259 A * | 7/1995 | Robin | 217/65 |
| 5,671,854 A * | 9/1997 | Thomas | 220/1.5 |
| 6,227,397 B1* | 5/2001 | Kim | 220/8 |
| 6,585,126 B1 | 7/2003 | Grigsby, Sr. et al. | |
| 6,726,041 B2 | 4/2004 | Dunn | |
| 6,814,529 B2* | 11/2004 | Junge | 410/46 |
| 6,938,557 B1 | 9/2005 | Grigsby, Jr. | |
| 7,011,223 B1 | 3/2006 | Grigsby, Sr. | |
| 2004/0188307 A1* | 9/2004 | Beck | 206/503 |
| 2005/0000834 A1* | 1/2005 | Clive-Smith et al. | 206/335 |
| 2005/0006261 A1* | 1/2005 | Clark et al. | 206/335 |

OTHER PUBLICATIONS http://www.nacontainer.com/products/SteelRet.asp, North American Container Corp., Steel Returnable Packaging, printed on May 13, 2005.

* cited by examiner

Primary Examiner—Anthony D. Stashick
Assistant Examiner—Niki M. Eloshway
(74) Attorney, Agent, or Firm—Cahn & Samuels, LLP

(57) ABSTRACT

A shipping crate for shipping objects such as all-terrain vehicles (ATVs) and personal water-crafts (PWCs). The shipping crate is completely recyclable and includes a top frame structure and a bottom frame structure. The top and bottom frame structures are operable to telescopically engage each another when the crate is empty. Also, leg portions can be placed between the top and bottom frame structures and the leg portions can telescopically engage the top and bottom frame structures at opposite ends thereof.

6 Claims, 13 Drawing Sheets

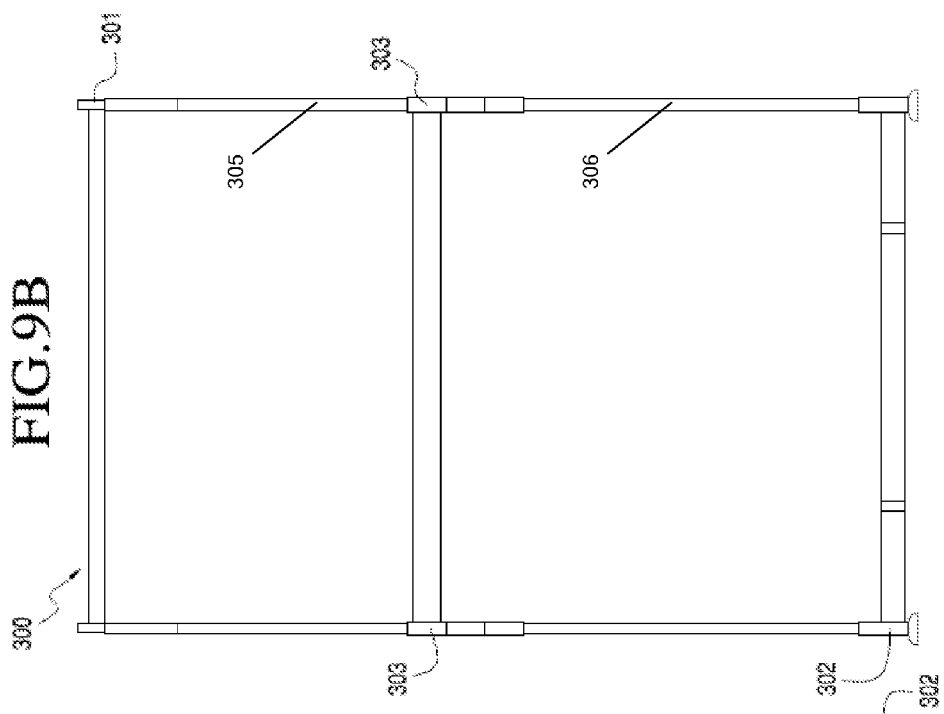
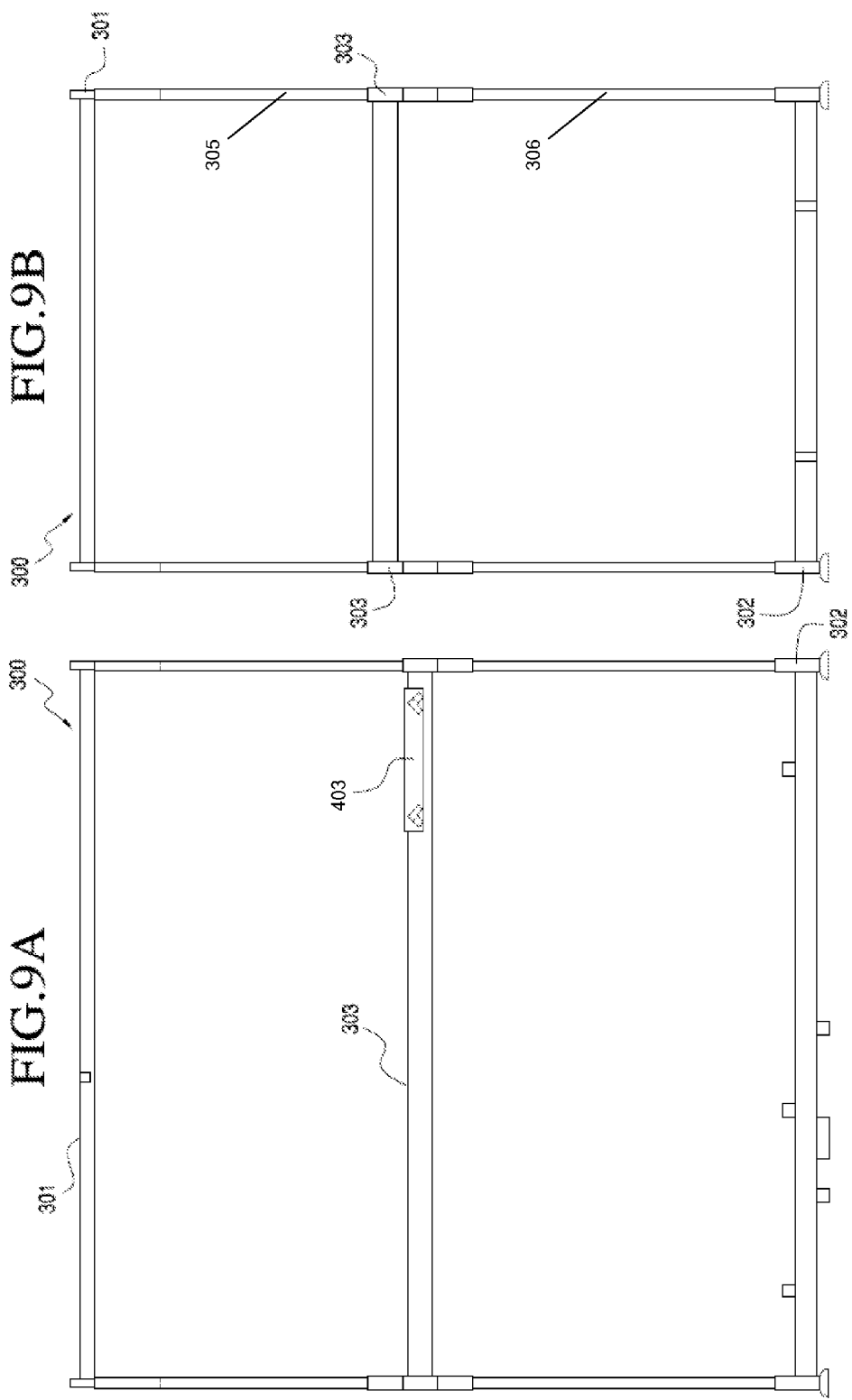

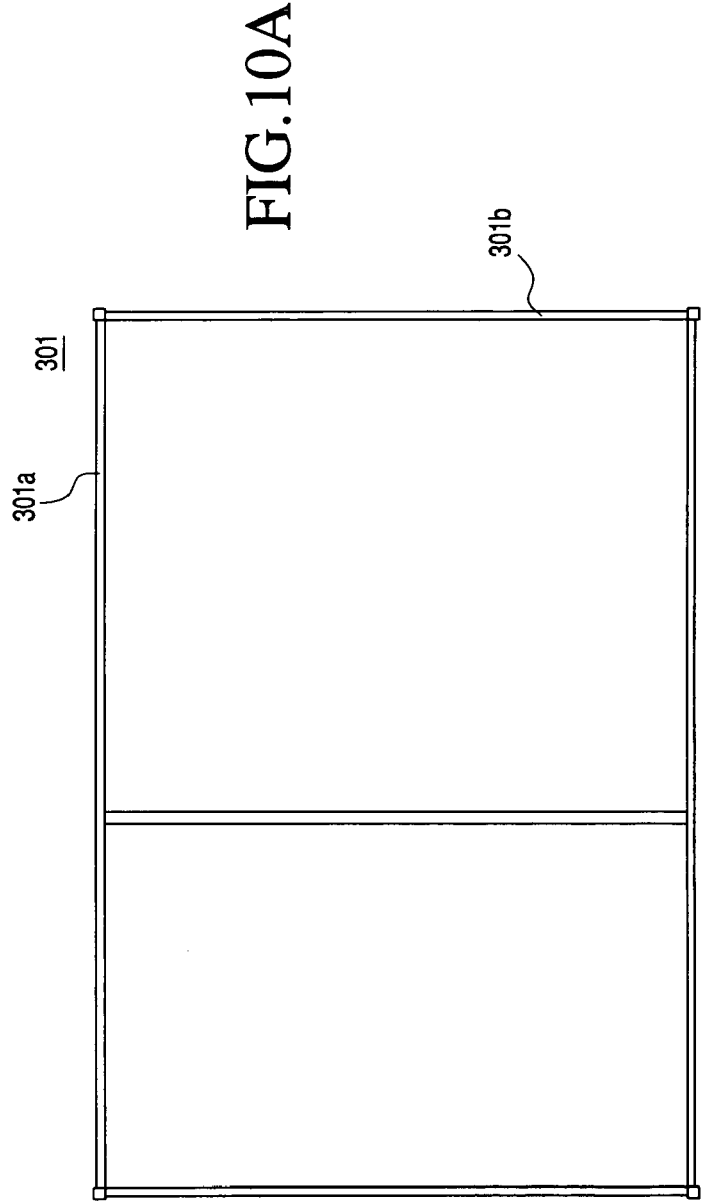
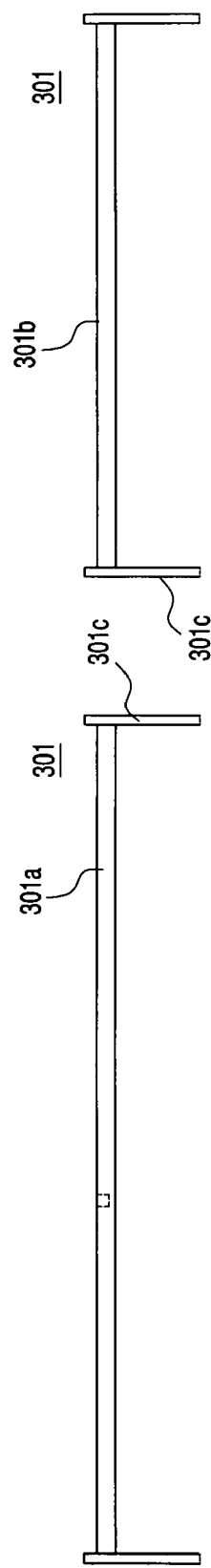
FIG.10A
FIG.10B
FIG.10C

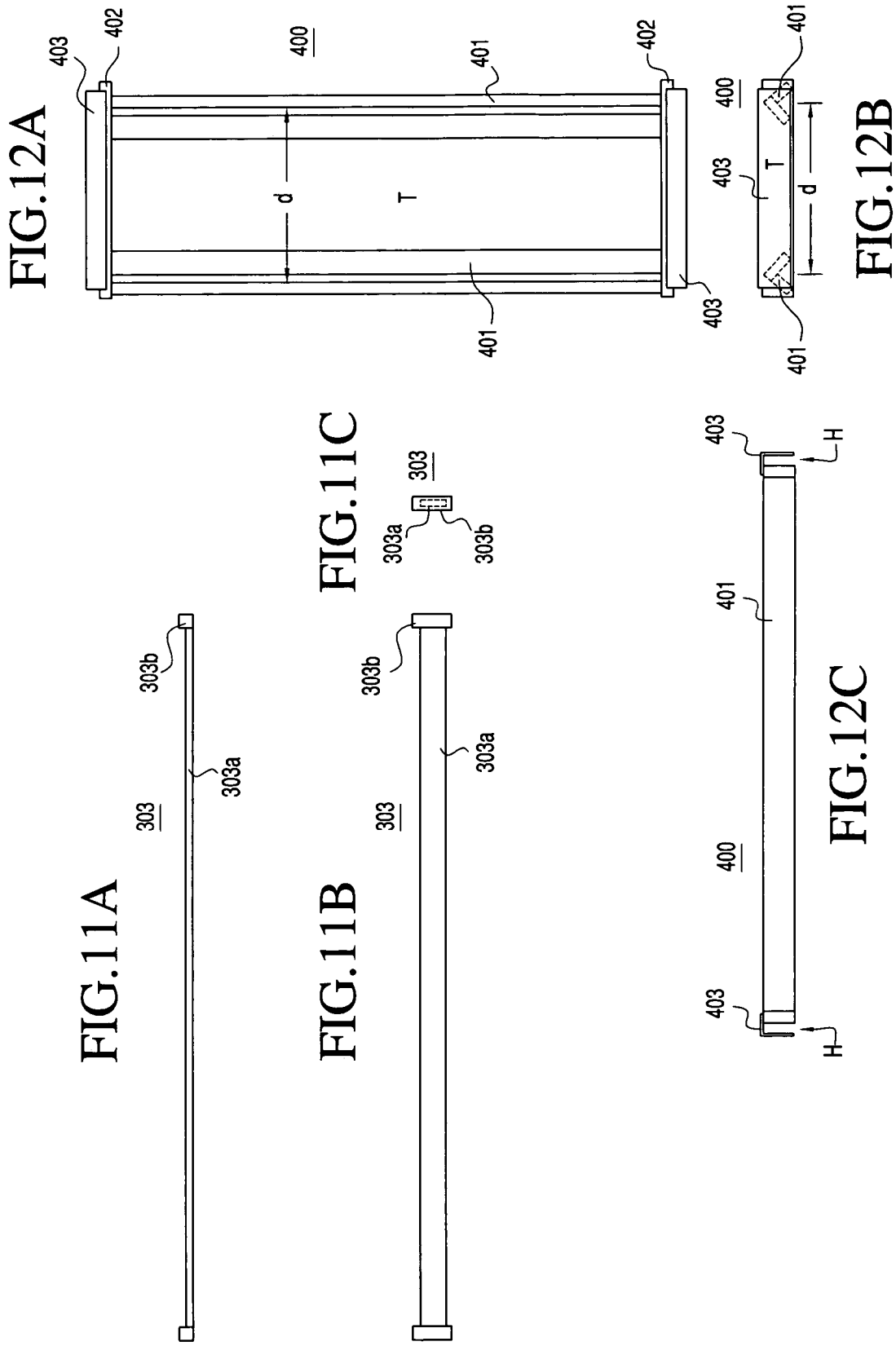

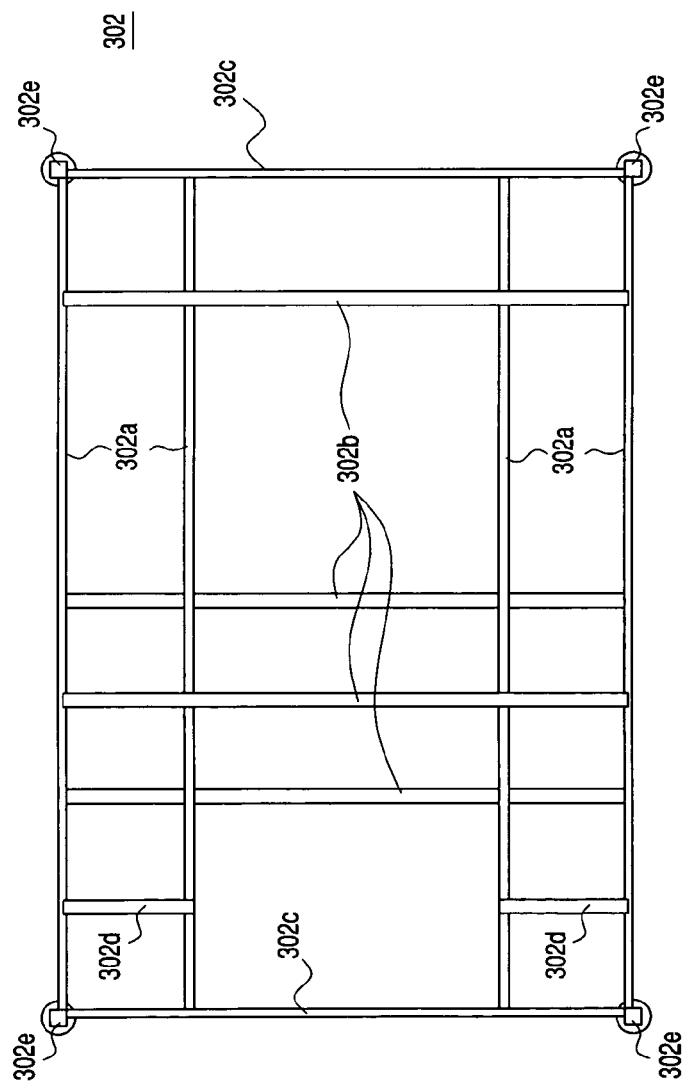
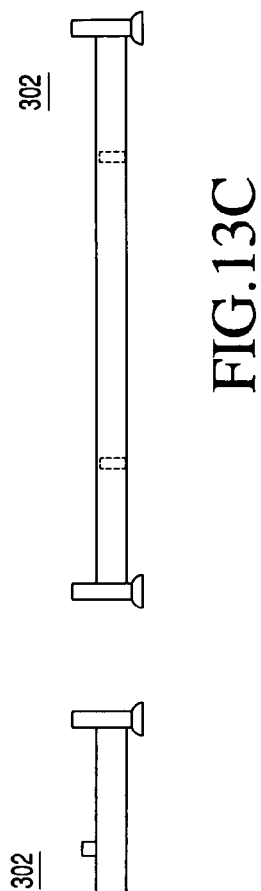
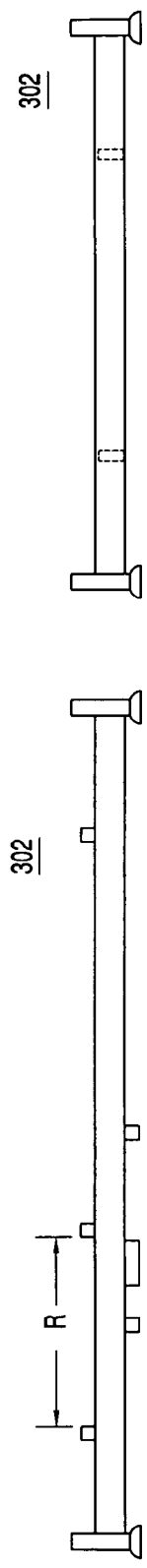
FIG.13A
FIG.13B
FIG.13C

MODULAR REUSABLE VEHICLE SHIPPING CRATE

CROSS REFERENCE TO RELATED APPLICATIONS

This application is an application filed under 35 U.S.C. § 111(a) claiming benefit pursuant to 35 U.S.C. § 119(e)(1) of the filing date of the Provisional Application 60/588,046 filed on Jul. 15, 2004 pursuant to 35 U.S.C. § 111(b), the entire contents of which are incorporated herein by reference.

FIELD OF THE INVENTION

An apparatus consistent with the present invention relates generally to a shipping crate. More particularly, an apparatus consistent with the present invention relates to a shipping crate for transporting objects such as, for example, an all-terrain vehicle (ATV) or personal water craft (PWC). A shipping crate in accordance with the present invention is constructed with a sturdy frame such that the contents of the container are protected from external damage while the crate and its contents are being shipped from one location to another, for example, via a tractor trailer, a railcar or a boat.

BACKGROUND OF THE INVENTION

Often, upon reaching their appointed destination and being unpacked, shipping crates for vehicles such as ATVs and PWCs are disposed of by the vehicle dealer or transporter. A shipping crate in accordance with the present inventive design, however, is substantially 100% recyclable.

When certain articles of manufacture are shipped, it is known to enclose the articles in a shipping container, or crate, in order to protect the article from damage caused by objects that would otherwise come in contact with the article, or from damage caused by the article being dropped or otherwise mishandled. When the weight and/or value of the article being shipped within a particular crate are relatively large, the complexity and sturdiness of the respective crate housing the article is also relatively large. Accordingly, for articles such as ATVs and PWCs, metal shipping crates are typically employed.

Several such shipping crates capable of shipping ATVs and PWCs have been proposed. However, the previously proposed crates suffer from various disadvantages as discussed below.

For example, U.S. Pat. No. 6,726,041, to Dunn, discloses a metal shipping crate for shipping an ATV. According to the Dunn patent disclosure, the disclosed crate is easily modifiable to accommodate different sizes of cargo, e.g., ATVs. According to the Dunn disclosure, the Dunn crate can be either discarded or reused after the cargo has been removed.

The Dunn shipping crate is made of tubular metal rails with separate top and bottom portions that are joined together by tubular metal posts. Further, the bottom portion of the Dunn crate is reportedly adjustable to accommodate various sizes of cargo, as needed.

The Dunn shipping crate, however, suffers from certain disadvantages and inefficiencies which are resolved by a crate in accordance with the present invention. In particular, although the Dunn shipping crate can likely be disassembled after it is used for shipping an ATV, and can be returned to the shipper to be reused, the disassembled Dunn crate takes up an inordinate amount of space, thereby, wasting valuable cargo space when shipping the disassembled crate back to the shipper for reuse.

Further, crates like the one disclosed in Dunn are susceptible to "racking" when weight is placed on top of the crate. Racking, according to this disclosure, refers to a phenomenon where the top of the crate moves independently from the bottom of the crate. Oftentimes, when a structure, such as the rectangular Dunn crate, is moved rapidly, such as by being transported in a truck, the top of the structure will move out of alignment with the bottom of the structure and place undue strain on the joints of the structure. This "racking" effect is exacerbated as the amount of weight placed on top of the structure is increased, such as when heavy shipping crates are stacked on top of each other.

A crate in accordance with U.S. Published Patent Application No. 20040188307, to Beck, suffers from at least the same disadvantages as those described above in regard to the Dunn crate. The ATV shipping crate disclosed in the Beck application includes a base frame and a top frame. Corner posts are received in corresponding sockets located at respective corners of the top and bottom frames. The, top and bottom frames of the Beck crate are maintained a certain distance from each other, the respective distance being determined by the length of the posts.

If the Beck crate were disassembled after use, however, for example to return the empty crate to the shipper for reuse, similar to the Dunn crate above, the Beck crate would take up an excessive amount of valuable space on the vehicle of the return-shipper. Also, like the Dunn crate above, the Beck crate is susceptible to racking. Thus, when used to carry stacked heavy loads, the joints, particularly in the corners of the crate, are vulnerable to cracking, or other forms of deterioration.

SUMMARY OF THE INVENTION

Illustrative, non-limiting embodiments of the present invention overcome the aforementioned and other disadvantages associated with related art shipping crates. Also, the present invention is not required to overcome the disadvantages described above and an illustrative non-limiting embodiment of the present invention may not overcome any of the problems described above.

It is an aspect of the present invention to provide a shipping crate with top and bottom portions thereof that can be compacted with one another when the crate is empty to minimize the amount of space occupied by the empty, disassembled, crate.

It is a further aspect of the present invention to provide a shipping crate that provides a sturdy container in which to transport large, heavy, objects.

It is a further aspect of the present invention to provide a shipping crate with a sturdy frame and which avoids excessive deflection of the frame components and provides continuous rigidity throughout the frame at all times, e.g., when an article is stored within and when disassembled and compacted for return to the shipper or other location when empty.

Further, aspects of a shipping crate consistent with the present invention include easy compaction to a much smaller size after the contents have been removed so as to enable efficient, space-saving, return of the empty containers; sturdy construction to avoid deflection of the crate during transport and to avoid "hopping".

A crate in accordance with the present invention comprises a top portion including a plurality of top cross-members each fixedly attached to one or more top corner portions and a bottom portion comprising a plurality of bottom cross-members each fixedly attached to one or more bottom corner portions. To provide a sturdy configuration and to permit efficient compaction of the crate when empty, the top corner portions and the bottom corner portions are operable to telescopically engage each other. Each of the top, bottom and corner portions can be made of tubular metal components or other suitable material that provides a sturdy frame and telescoping engagement of the components.

Also, in accordance with the present invention, to accommodate the telescoping engagement of the corner components, the outer dimension of each of either the top or bottom corner portions is smaller than the inner dimension of the other of the top or bottom corner portions. Leg portions, each comprising two ends and each end being operable to engage a respective top or bottom corner portion can also be used to construct a shipping crate in accordance with the present invention. The inner dimension of one of the ends of the legs is such that it can telescopically fit into either a top or bottom corner portion and the outer dimension of the other end of the legs is such that it can telescopically be received into an opposing top or bottom corner portion.

Also, in accordance with the present invention, the top of the crate is made such that the linear dimensions, e.g., length and/or width, of the top frame, are smaller than the corresponding linear dimensions of the bottom of the crate.

In accordance with a further embodiment of the present invention a crate is provided that accommodates a vehicle within for shipping wherein the vehicle is accommodated at an angle within the crate.

As used herein "substantially" is a relative modifier intended to indicate permissible variation from the characteristic so modified. It is not intended to be limited to the absolute value or characteristic which it modifies but rather approaching or approximating such a physical or functional characteristic.

BRIEF DESCRIPTION OF THE DRAWINGS

The aspects of the present invention will become more readily apparent by describing in detail illustrative, non-limiting embodiments thereof with reference to the accompanying drawings, in which:

FIGS. 9A and 9B are perspective side and front views, respectively, of an empty crate in accordance with the embodiment illustrated in FIG. 8.

FIGS. 10A, 10B and 10C are perspective top, side and front views, respectively, of a top frame assembly of a crate in accordance with the embodiment illustrated in FIG. 8.

FIGS. 11A, 11B and 11C are perspective top, side and end views, respectively, of a middle frame assembly of a crate in accordance with the embodiment illustrated in FIG. 8.

FIGS. 12A, 12B and 12C are perspective top, side and end views, respectively, of a rear tire saddle assembly of a crate in accordance with the embodiment illustrated in FIG. 8.

FIGS. 13A, 13B and 13C are perspective top, side and end views, respectively, of a base frame assembly of a crate in accordance with the embodiment illustrated in FIG. 8.

DETAILED DESCRIPTION OF ILLUSTRATIVE, NON-LIMITING EMBODIMENTS

Exemplary, non-limiting, embodiments of the present invention are discussed in detail below. While specific configurations and dimensions are discussed to provide a clear understanding, it should be understood any disclosed dimensions and configurations are provided for illustration purposes only. A person skilled in the relevant art will recognize that other dimensions and configurations may be used without departing from the spirit and scope of the invention.

Figure 1:
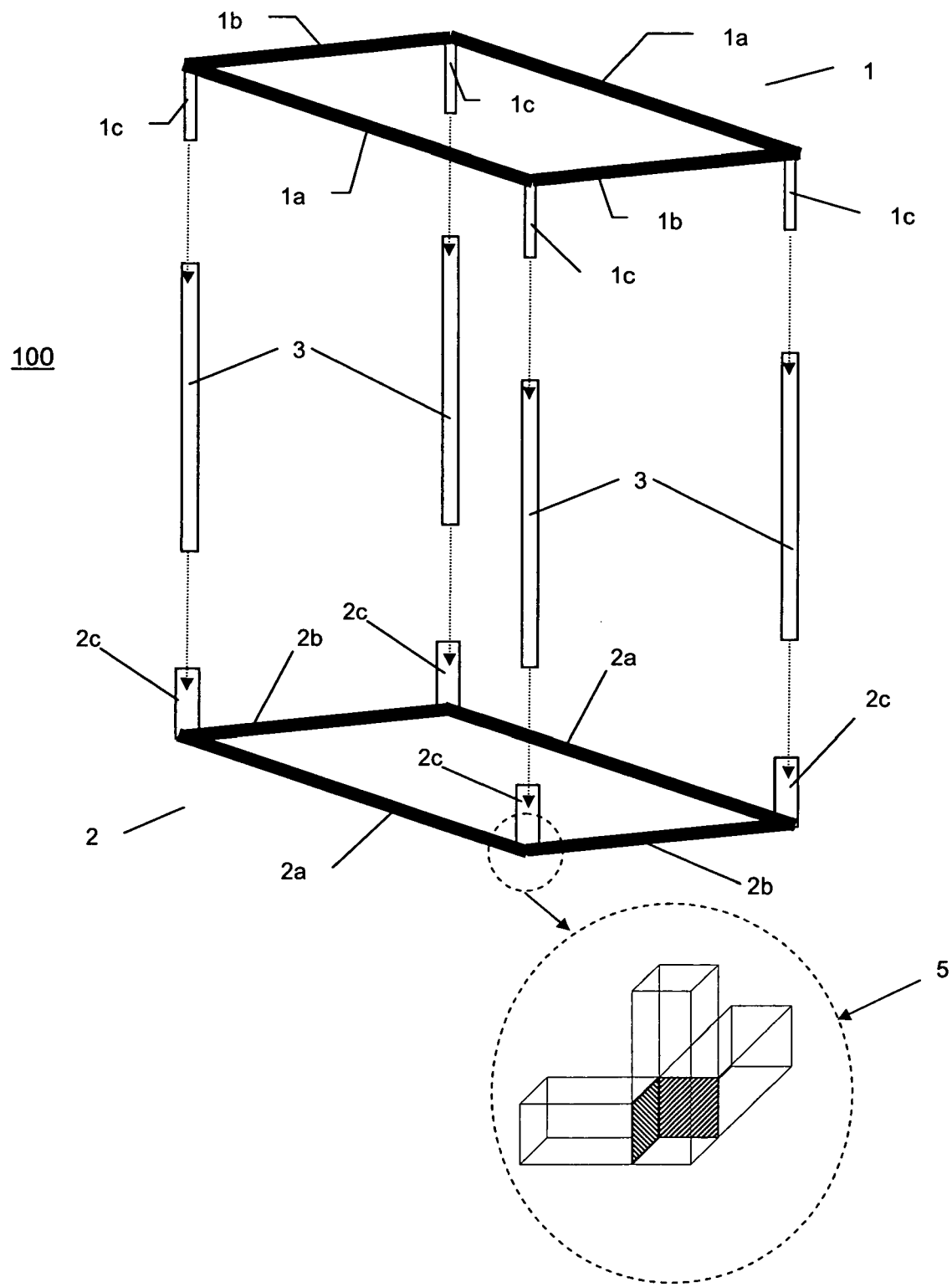
FIG. 1 is an exploded view of a shipping crate in accordance with the present invention.

FIG. 1 illustrates an exploded view of a shipping crate in accordance with one exemplary embodiment of the present invention. As shown in FIG. 1, a crate 100 according to the present invention comprises a rectangular top frame 1, a corresponding rectangular bottom frame 2 and legs 3. Rectangular top frame 1 comprises two parallel top length bars 1a and two parallel top cross bars 1b which are perpendicular to length bars 1a. Attached at each corner of top frame 1 is a top corner portion 1c which is fixedly attached to the length and cross bars. Rectangular bottom frame 2 comprises two parallel bottom length bars 2a and two parallel bottom cross bars 2b which are perpendicular to length bars 2a. Attached at each corner of bottom frame 2 is a bottom corner portion 2c which is fixedly attached to the bottom length and cross bars, 2a and 2b.

In accordance with the present embodiment, corner portions 1c and 2c, respectively of top frame 1 and bottom frame 2, are end-welded to the top and bottom length and cross bars. End-welding the corner portions in this manner provides for a stronger connection, e.g., between the length and cross bars and the corner portions, than that which is provided by related-art attachment techniques, and also helps to minimize the occurrence of joint-cracking—a phenomenon that readily occurs in related-art crates. An enlarged view of one of the end-welded joints in accordance with the present embodiment is shown within dotted circle 5, in which the welded ends of bottom length bar 2a and bottom cross bar 2b are identified by cross-hatching. It should be noted that according to the present embodiment, every corner joint, i.e., where corner portions 1c and 2c are joined to corresponding length and cross bars 1a, 1b and 2a, 2c, respectively, of the top and bottom frames, are end-welded in similar fashion to that which is shown in the blow-up circle 5 of FIG. 1.

In addition to end-welding the corner portions of the respective frames to the length and cross bars, i.e., where the ends of the length and cross bars are welded directly to two respective perpendicular faces of the corner portions, other means of attaching the corner portions can also be effectively utilized. For example, the respective ends of the length and cross bars can be welded together and the corner portion can then be attached to either the inside or the outside of the corner joint thus created. Also, the corner portions could be created integral with either the length or cross bar and then attached to the other of the length or cross bar that makes up that corner.

Top and bottom frames, 1 and 2, in this exemplary embodiment are each made of hollow metal bars. For example, in the embodiment illustrated in FIG. 1, length bars 1a and 2a and cross bars 1b and 2b are each made of hollow rectangular metal tubes the cross-section of which is 2.540 cm (1 inch) wide by 5.080 cm (2 inches) high. It should be recognized, however, that the present invention is not limited to using hollow metal tubing, or material with these specific dimensions. For example, according to an alternative exemplary embodiment, not illustrated, the length and cross bars are made of a solid material, such as metal, plastic, composite material, or any other material of suitable strength. Additionally, the cross-sectional dimensions of the length and cross bars can be any suitable dimension that provides adequate rigidity to the frames.

Figure 2:
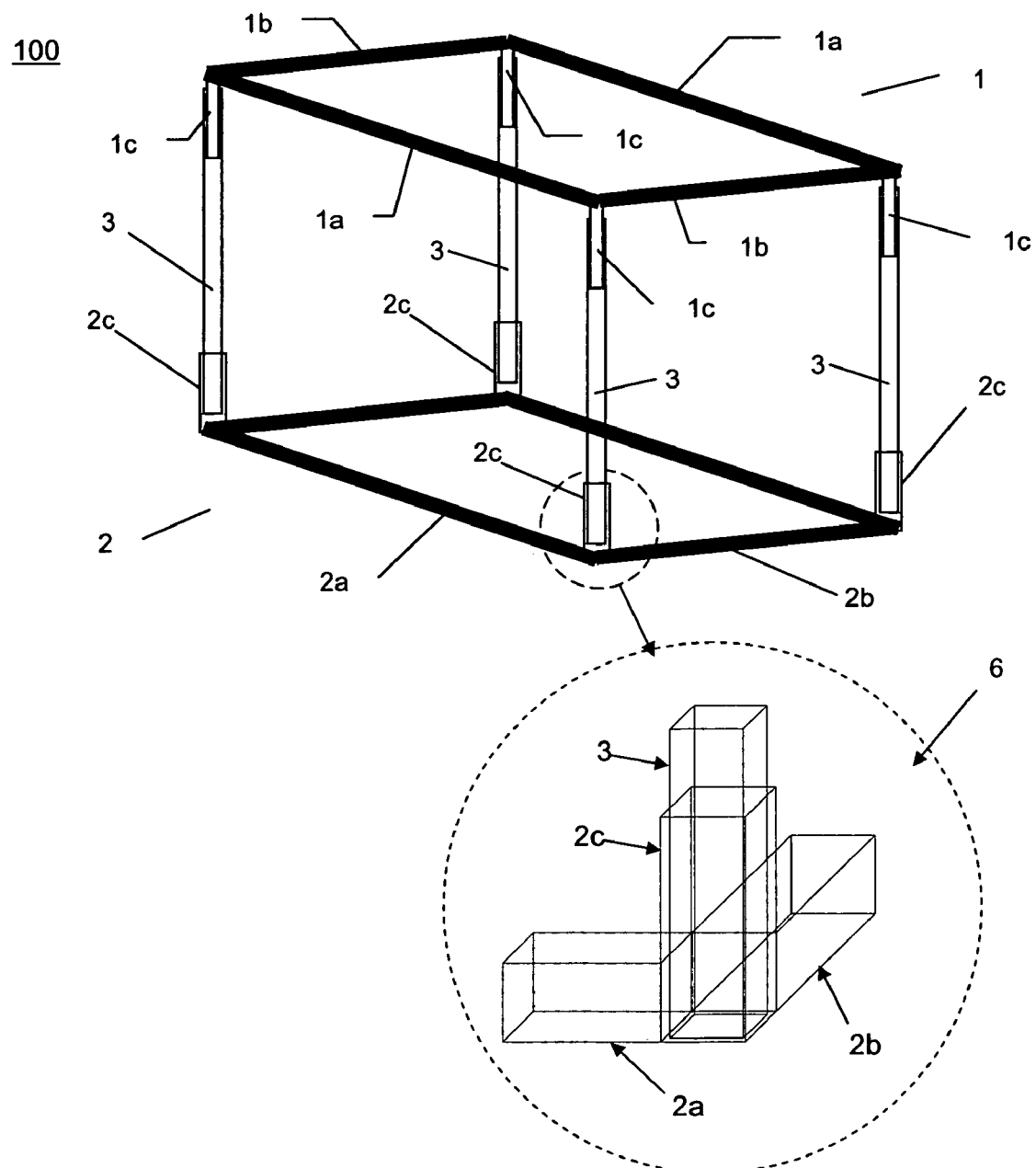
FIG. 2 is a perspective view of an exemplary embodiment of an assembled shipping crate in accordance with the present invention.

As shown in FIG. 2, the four legs 3 are provided at the corners of the crate when it is assembled. As indicated by the dotted-arrow lines in FIG. 1, legs 3 are attached at their respective ends to the top and bottom frame portions, 1 and 2. Legs 3 in this embodiment are also made of tubular metal.

As indicated by the dotted-arrow lines in FIG. 1 and shown in the assembled crate of FIG. 2, each top corner portion 1c is received into a respective top end of a leg 3 and the bottom end of each leg 3 is received into a respective bottom corner portion 2c of bottom frame 2. Accordingly, the top corner portions 1c, legs 3 and bottom corner portions 2c telescopically engage one another.

In accordance with this embodiment, in order to accommodate the telescopic engagement described, the outer dimension of the top corner portions 1c is smaller that the inner dimension of the corresponding top ends of legs 3. Further, the outside dimension of the bottom ends of legs 3 is smaller than the inner dimension of the bottom corner portions 2c. For example, according to one embodiment, top corner portions 1c are made of rectangular metal tubing which has a cross sectional area that is 3.175 cm by 3.175 cm (1¼ inches by 1¼ inches), and legs 3 are made of rectangular metal tubing which has a cross sectional area that is 3.81 cm by 3.81 cm (1½ inches by 1½ inches). Accordingly, as long as legs 3 are made from tubular metal which has a wall thickness of 0.3175 cm (⅛ inch) or less, top corner portions 1c will fit inside the top ends of legs 3.

Further, in accordance with the embodiment shown in FIGS. 1 and 2, bottom corner portions 2c are made of metal tubing which has a cross-sectional area that is 4.445 cm by 4.445 cm (1¾ inches by 1¾ inches). Accordingly, as illustrated in blow-up circle 6 in FIG. 2, as long as corner portions 2c are made from tubular metal which has a wall thickness of 0.3175 cm (⅛ inch) or less, the bottom ends of legs 3 will fit inside bottom corner portions 2c.

Also, in accordance with this embodiment, the overall length and the overall width of the top frame 1 are made shorter than the overall length and width of the bottom frame 2. Specifically, in addition to the top corner portions having smaller dimensions, e.g., 3.175 cm by 3.175 cm (1¼ inches by 1¼ inches), than the bottom corner portions, e.g., 4.445 cm by 4.445 cm (1¾ inches by 1¾ inches), the length and cross bars, 1a and 1b, of the top frame 1 are each made shorter than the corresponding length and cross bars, 2a and 2b, of the bottom frame 2. For example, the top length bars are 2.153 m (84¾ inches) long and the top cross bars are 1.143 m (45 inches) long. The corresponding length and cross bars of the bottom frame are 2.146 m (84½ inches) and 1.130 m (44½ inches) long, respectively. Accordingly, in this example, the overall length of the top frame 1 is 2.216 m (87¼ inches) and the overall width is 1.207 m (47½ inches). Correspondingly, the overall length of the bottom frame is 2.235 m (88 inches) and the overall width is 1.213 m (47¾ inches). By having the top frame dimensions smaller than the bottom frame dimensions, the racking effect is minimized.

Figure 3:
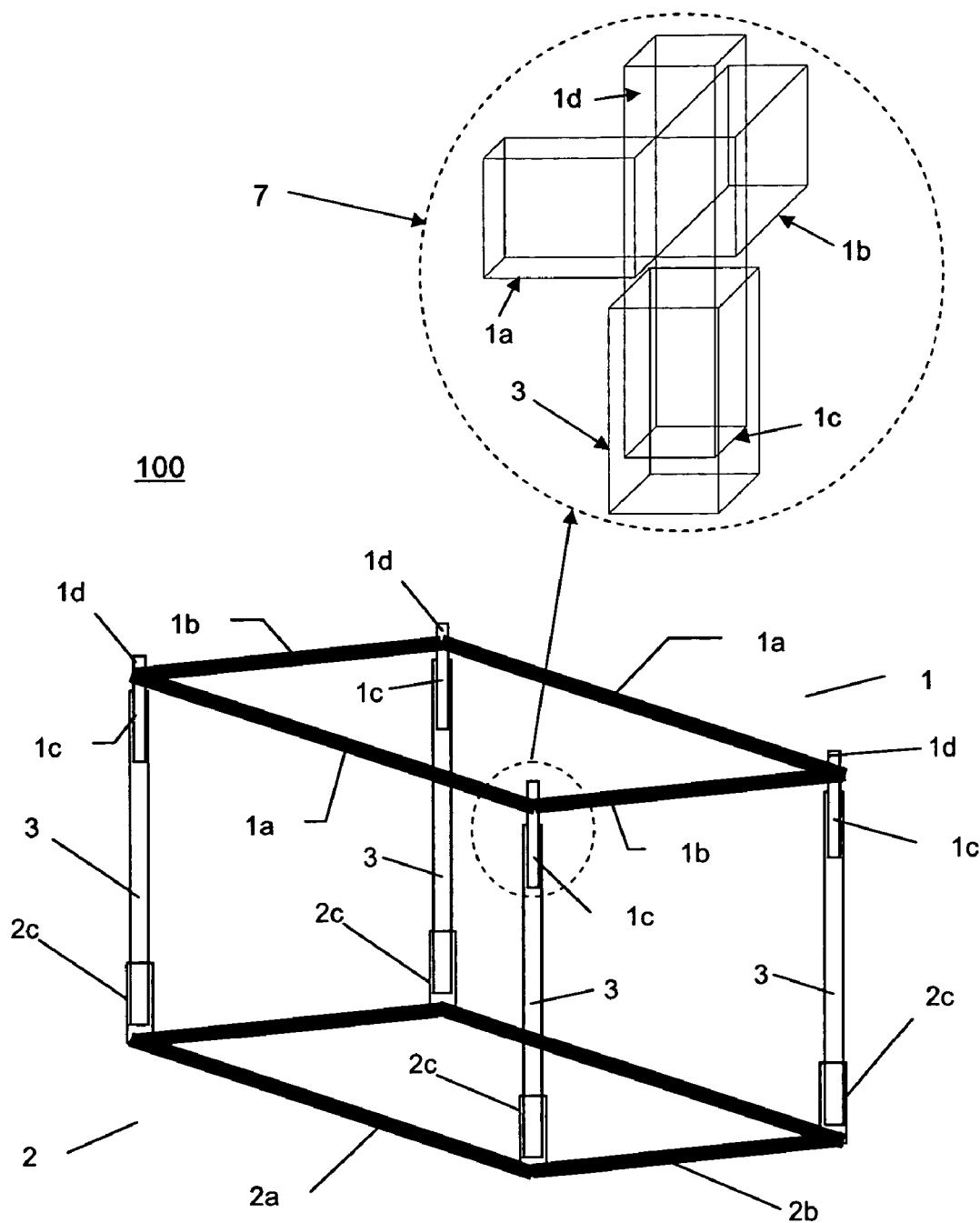
FIG. 3 is a perspective view of an alternative exemplary embodiment of an assembled shipping crate in accordance with the present invention.

Referring to FIG. 3, an alternative exemplary embodiment of the present invention is shown. Substantially all of the structural components of the crate illustrated in FIG. 3 in accordance with this alternative embodiment are similar to the structural components shown in FIGS. 1 and 2, with a few exceptions as discussed in detail below. Accordingly, like components are labeled in FIG. 3 with the same reference number as the corresponding component in FIGS. 1 and 2.

One difference between the crate shown in FIG. 3 and the crate shown in FIGS. 1 and 2 is the addition of nub portion 1d, which extends above the top of length bars 1a and cross bars 1b on each of the corners of the top frame 1. Nub portions 1d can be integral with top corner portions 1c or they can be separate components provided on top of, or adjacent to, top corner portions 1c. As shown in blow-up circle 7 in FIG. 3, top corner portion 1c comprises nub portion 1d, i.e., nub portion 1d is integral with corner portion 1c. As shown with respect to the embodiment of FIG. 3, nub portion 1d extends above the location on corner portion 1c where length bar 1a and cross bar 1b are attached to corner portion 1c. The purpose of nub portions 1d will become apparent in the discussion below in regard to FIGS. 4-6.

Figure 4:
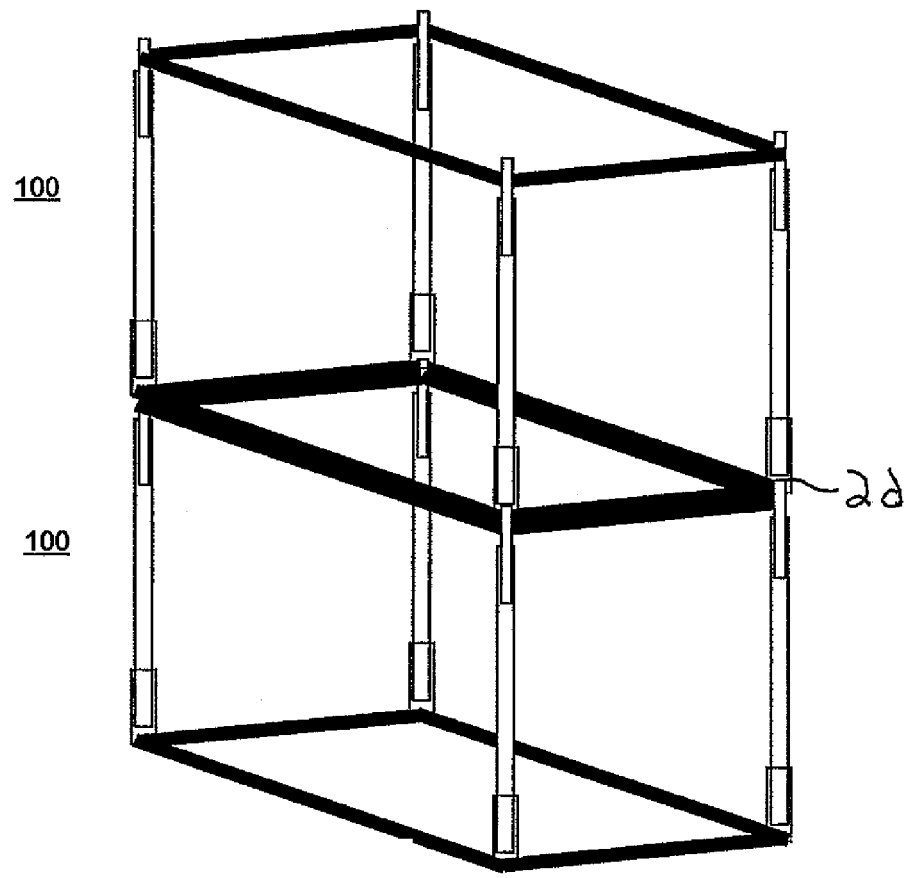
FIG. 4 is a perspective view of a stacked configuration of two shipping crates in accordance with the present invention.

Referring to FIG. 4, an embodiment of the present invention is illustrated which comprises two similar shipping crates 100 stacked on top of one another. The two shipping crates shown in FIG. 4 are structurally similar to the crate 100 shown in FIG. 3. Two or more crates are stacked, for example, to maximize storage space when the full crates are in transit or when the crates are otherwise stored. According to the present embodiment, to accommodate easy stacking of the crates, a receiving portion 2d is provided at each corner on the lower side of bottom frame 2 of each crate 100. Receiving portions 2d receive nubs 1d from the top frame 1 and, thus, when the crates are stacked, the upper crate does not easily become separated from the lower crate.

In the embodiment shown, receiving portion 2d is integral with bottom corner portion 2c. However, one skilled in the art will recognize that other configurations are also possible. For example, receiving portion 2d can be a separate structure (not shown) attached to the bottom of each of the corner portions 2d.

Figure 5:
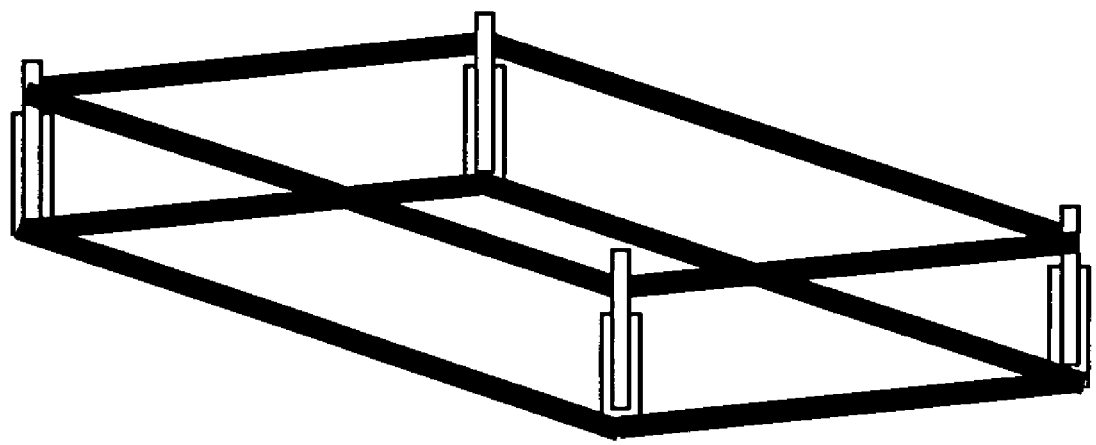
FIG. 5 is a perspective view of telescopically engaged top and bottom frames of an empty crate in accordance with the present invention.

FIG. 5 illustrates a further advantageous aspect of the present invention. In particular, as illustrated in FIG. 5, legs 3 have been removed from crate 100, for example after the crate has been used to deliver its cargo and it is intended to return the shipping crate or otherwise deliver the empty crate to another location. With legs 3 removed, top frame 1 is telescopically engaged with bottom frame 2 directly. That is, due to the dimensions of the top and bottom frame components, for example as discussed above in regard to the embodiment of FIG. 2, each of the top corner portions 1c is inserted into a corresponding bottom corner portion 2c. In similar fashion to the embodiment discussed above, top corner portions 1c have an outer dimension that is less than an inner dimension of bottom corner portions 2c.

For example, top corner portions 1c are made of tubular metal with a rectangular cross-sectional outer dimension of 3.175 cm (1¼ inches) by 3.175 cm (1¼ inches). Further, bottom corner portions are also made of tubular metal but with a rectangular cross-sectional outer dimension of 4.445 cm (1¾ inches) by 4.445 cm (1¾ inches). Accordingly, using these exemplary dimensions, as long as the tubular metal used to make bottom corner portions 2c has a wall thickness of less than or equal to 0.635 cm (¼ inch), the top corner portions 1c will fit into bottom corner portions 2c.

When the top and bottom frames of an empty shipping crate in accordance with the present invention are stacked in this manner, a significant amount of space is saved in comparison to that which is occupied by other empty, related art, shipping crates. Accordingly, significant efficiencies can be realized by the shipper and/or supplier of the goods shipped.

Figure 6:
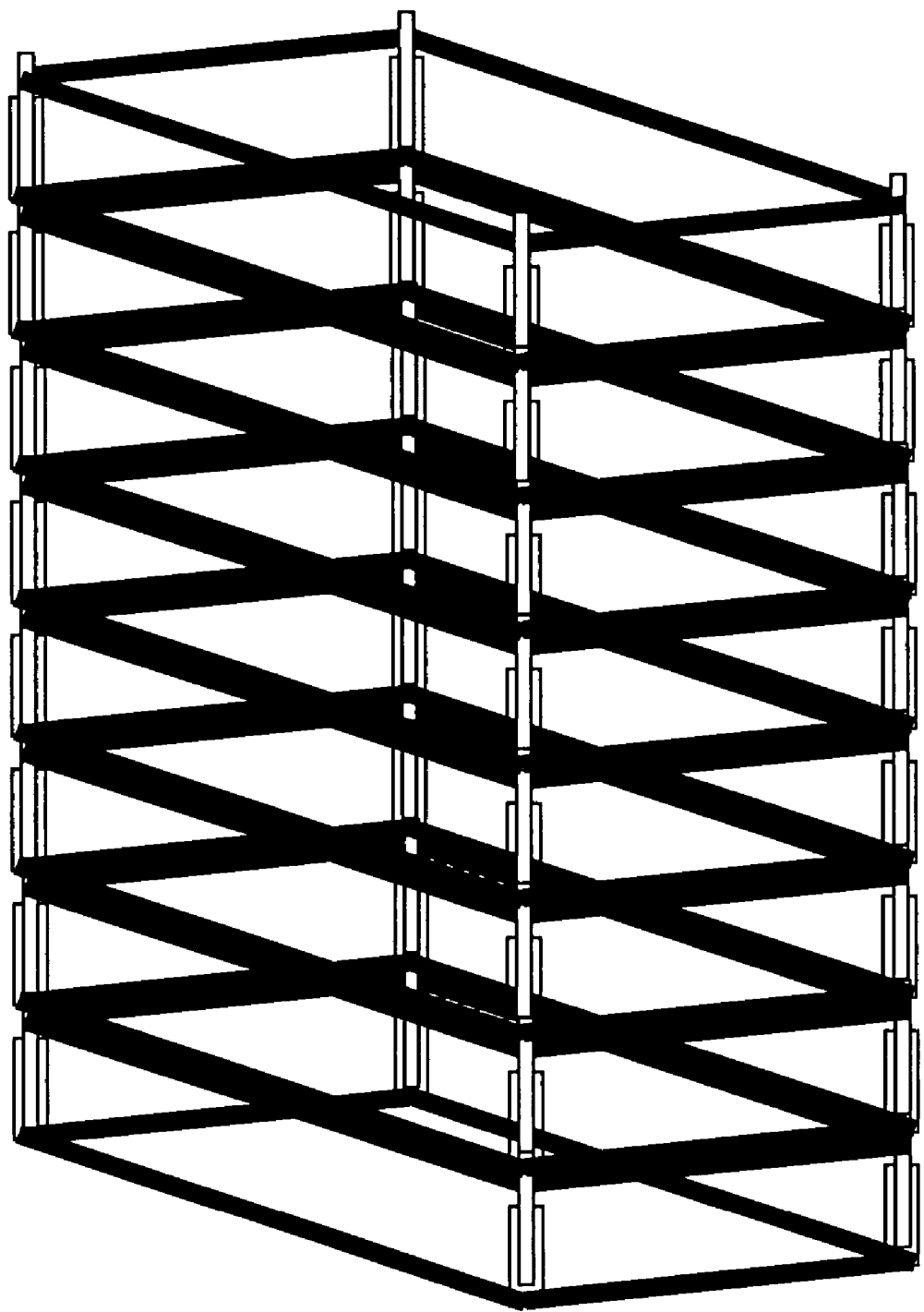
FIG. 6 is a perspective view of a plurality of corresponding top and bottom frames in a stacked configuration in accordance with the present invention.

FIG. 6 illustrates a plurality of empty shipping crates stacked on top of each other in accordance with the present invention. As shown, nub portions 1d on the top frames 1 are received into the receiving portions 2d, as discussed above in detail with respect to FIG. 3. Accordingly, as discussed above in regard to stacking full shipping crates, empty shipping crates can be telescopically combined and stacked on top of one another, thus, creating a sturdy stack of empty crates and also saving significant space within the return shipper's payload.

Figure 7:
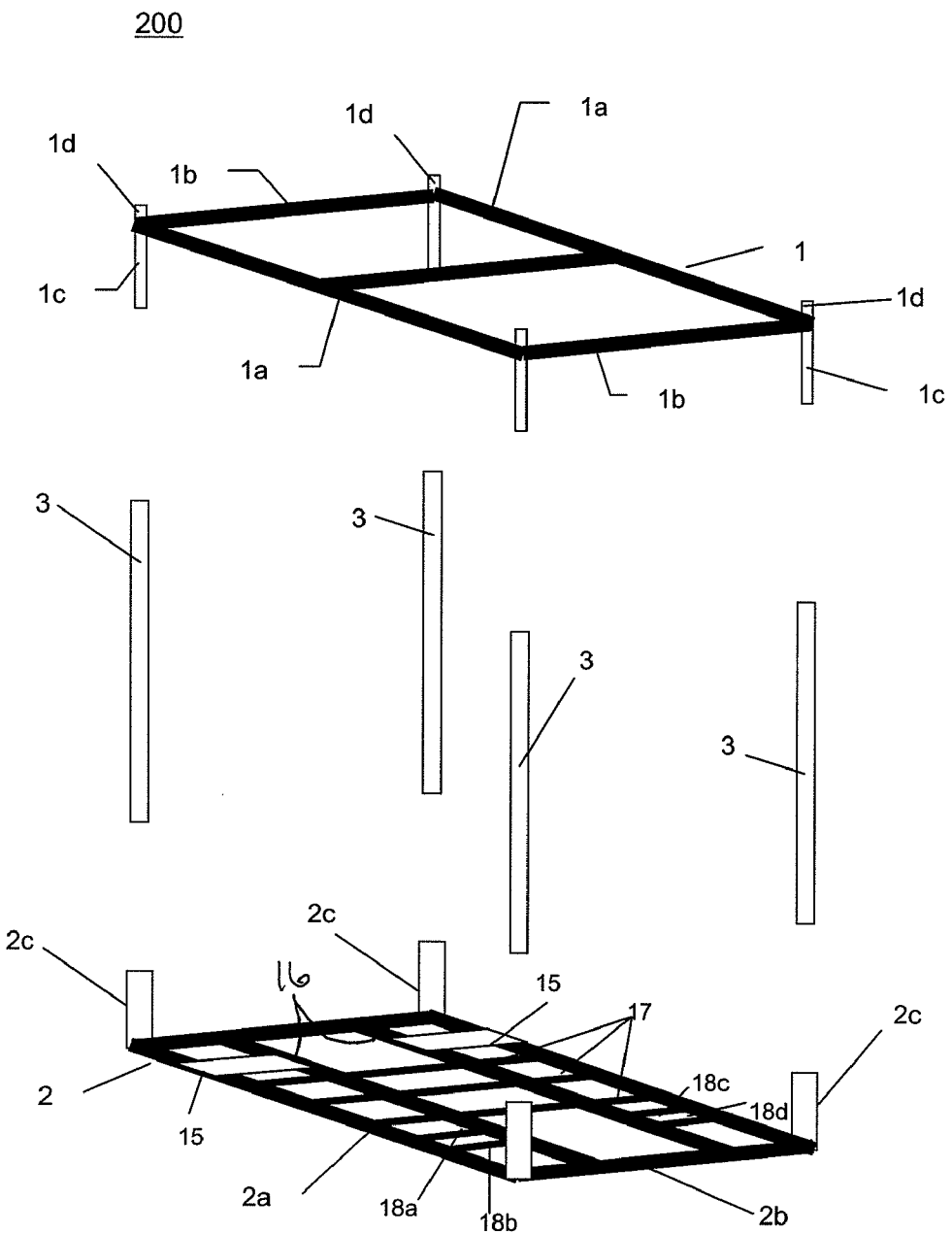
FIG. 7 is a perspective view of a further alternative exemplary embodiment of an assembled shipping crate in accordance with the present invention.

FIG. 7 illustrates a further alternative exemplary embodiment of the present invention. Several of the structural components of the crate illustrated in FIG. 7 in accordance with this alternative embodiment are the same as the structural components shown in FIGS. 1 and 2, with a few additions, as discussed in detail below. Accordingly, like components are labeled in FIG. 7 with the same reference number as the corresponding component in FIGS. 1 and 2.

The shipping crate illustrated in FIG. 7 in addition to including the telescoping corner joints similar to that which is described above in regard to FIGS. 1-6, also comprises plates 15, stringers 16, full width bar supports 17, and partial width bar supports 18a-18d.

As for other components described herein, stringers 16 according to this embodiment are constructed of tubular metal. Stringers 16 extend between bottom cross bars 2b and provide additional strength to the overall structure of the base frame 2. Additionally, plates 15 are made of flat metal and respectively extend between, and are attached to, a stringer 16 and a bottom length bar 2a. Partial width bar supports 18a-18d each extend between, and are attached to, a stringer at one end thereof and a bottom length bar 2a at another end. According to the exemplary configuration shown in FIG. 7, partial width bar supports 18a-18d can be paired such that the pairs are provided on opposite sides of the bottom frame 2. Configuring the partial width bar supports in this manner enables them to be used as tire locators and/or supports in the event a vehicle with corresponding tires is shipped within the shipping crate.

Full width bar supports 17 extend between bottom length bars 1a and are connected at respective ends thereof. Full width bar supports 17 can be used, for example, to support a certain vehicle assembly in the event a vehicle with a corresponding assembly, such as a fork assembly on an ATV, is shipped within the shipping crate. Additional full and partial width bar supports can also be added, as needed, and certain supports can be removed if not needed.

Figure 8:
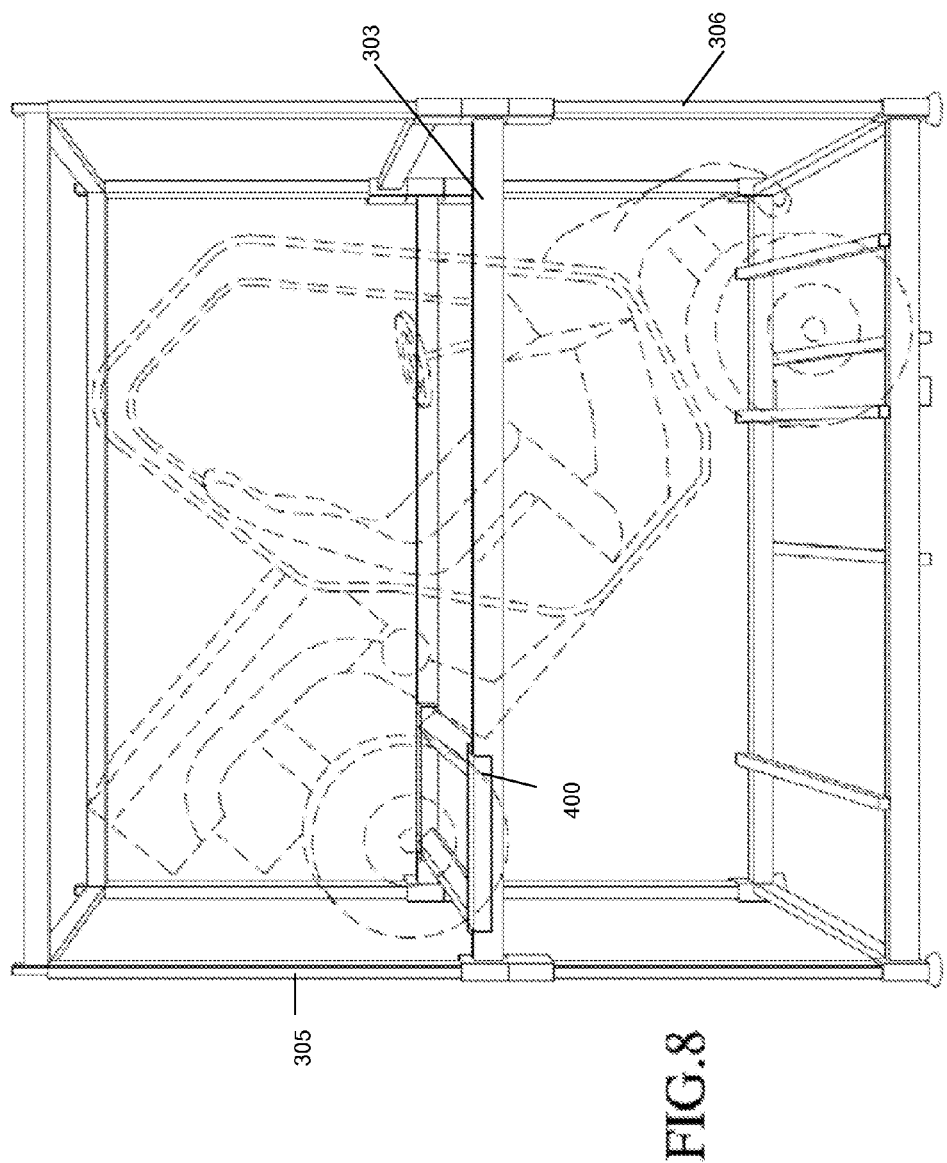
FIG. 8 is a graphic representation of a crate in accordance with a further embodiment of the invention in which the cargo stored within the crate is stored at an angle.

FIG. 8 illustrates an even further alternative exemplary embodiment of the present invention. Several of the structural components of the crate illustrated in FIG. 8 in accordance with this additional embodiment are similar to structural components shown in FIGS. 1 and 2, with some additions, as discussed in detail below.

FIGS. 9A and 9B illustrate side and front views, respectively, of an empty crate assembly consistent with the embodiment of FIG. 8. As FIGS. 9A and 9B illustrate, a crate 300 in accordance with this embodiment provides a top frame portion 301 and a bottom frame portion 302. The top and bottom frame portions shown in FIG. 9 are somewhat similar to the top and bottom frame portions illustrated in FIG. 1 in that the corner portions of the top frame portion are constructed such that they can insert into the corner portions of the bottom frame portion, consistent with the previous embodiments. Additionally, however, the crate illustrated in FIGS. 9A and 9B also provides a middle frame portion disposed between the top and bottom frame portions. Top leg portions 305 are mated with the corner portions of the top and middle frame portions and bottom leg portions are mated with the corner portions of the middle and bottom frame portions.

For example, the top leg portions 305 have an inside dimension, e.g., diameter, that is larger than the outer dimension of the corner portion of the top frame portion. Accordingly, the corner portions of the top frame portion can be inserted into, e.g., telescopically engage, one end of the top leg portions 305. The other end of the top leg portions are inserted into the corner portions of the middle frame portion. Additionally, bottom leg portions 306 have an outside dimension that is smaller than the inside dimension of the corner portion of the middle frame portion. Accordingly, one end of the bottom leg portions can be inserted into, e.g., telescopically engage, the corner portions of the middle frame portion. The other end of the bottom leg portions are inserted into the corner portions of the bottom frame portion.

Figure 14:
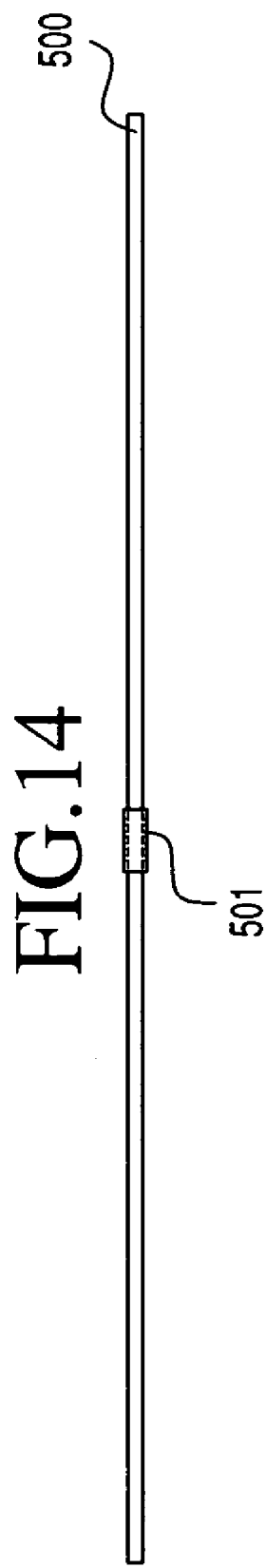
FIG. 14 is a perspective side view of a unitary leg portion in accordance with a further embodiment of the invention.
Figure 15A:
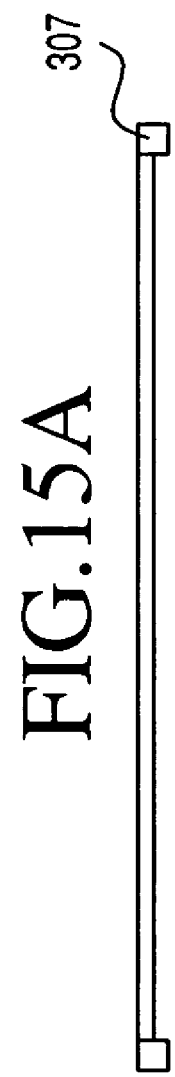
FIGS. 15A and 15B are perspective top and end views, respectively, of an end bar assembly of a crate in accordance with the embodiment illustrated in FIG. 8.
Figure 15B:
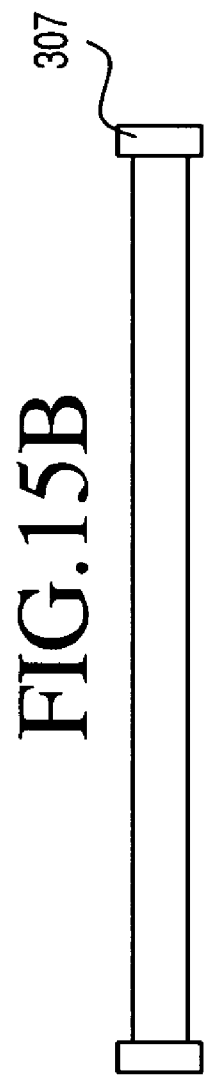

In accordance with a further embodiment, the top and bottom leg portions are constructed as a single integrated structure 500 as shown in FIG. 14. A sleeve 501 is placed around the outside of leg 500 and fixedly attached thereto at a location slightly offset from the midsection of leg 500. In accordance with this embodiment, leg 500 has an outer dimension that is less than the inner dimension of the corner portions of the middle frame portion. Accordingly, leg 500 can insert through the corner portion from the underside and slide up to the upper part of the sleeve 501. The top end of leg 500 telescopically engages with the corner of the top frame portion and the bottom end of leg 500 telescopically engages the corner portions of the bottom frame portion.

As shown in FIGS. 10A, 10B and 10C, top frame portion 301 includes length bars 301a, cross bars 301b and corner portions 301c. The manner by which each of the length and cross bars are attached to the corner portions 301c is similar to the manner by which these corresponding elements are assembled for the previous embodiment described with respect to FIG. 1.

FIGS. 11A, 11B and 11C illustrate top, side and end views, respectively, of the middle frame assembly of the crate shown in FIG. 9. The middle frame assembly of the crate of FIG. 9 includes two structures 303 as illustrated in FIG. 11. In particular, the overall middle frame assembly of a crate in accordance with this embodiment includes two structures 303 each of which includes a length bar 303a and two end pieces 303b. Length bar 303a is attached between the two end pieces 303b by butt-welding or a similar process.

FIGS. 12A, 12B and 12C illustrate top, side and end views, respectively, of a tire saddle assembly 400 for the crate shown in FIG. 9. In particular, tire saddle assembly 400 includes two end pieces 402 between which are connected two inverted "L-shaped" tire support members 401. As shown in FIGS. 12A and 12B, the two L-shaped tire supports are spaced apart a variable distance d creating a "V-shaped" area T into which a tire or tires is supported when the saddle assembly is connected to middle frame assemblies 303. Attachment portions 403 are attached to end pieces 402 and create an area H which hooks onto or otherwise connects to the length members 303a.

The saddle assembly 400 is operable to support one end of the cargo stored and shipped within the crate, as illustrated in FIG. 8. For example, as shown, when the crate is used to ship an ATV, the saddle portion 400 supports the front or rear tires of the ATV. The opposite set of tires is supported by the bottom frame portion, described below. In this manner, the ATV stored within the crate is stored at an angle relative to the top and bottom frame portions. Accordingly, a crate in accordance with this embodiment takes up less space in the horizontal direction or, in other words, in the direction parallel to the ATV.

According to one exemplary embodiment, as shown in FIG. 12B, an angle formed with respect to the slanted portion of the "L-shaped" cross member and the attachment portions 403 is approximately 40 degrees. However, a skilled artisan would know that other angles are possible depending on the size of the tires, or other object, being supported. Accordingly, the ATV stored within the crate is stored with one set of tires, e.g., either the front or rear set, being supported by the saddle portion of the middle frame portion and the other set of tires at the other end of the ATV is supported by the bottom frame portion.

As shown in FIGS. 13A, 13B and 13C, bottom, or base, frame portion 302 includes length bars 302a, cross bars 302b, end members 302c, bottom tire support members 302d and corner portions 302e. The manner by which each of the length (302a) and end members (302c) are attached to the corner portions 302e is similar to the manner by which these corresponding elements are assembled for the previous embodiment described with respect to FIG. 1.

Also, in accordance with one exemplary configuration of base frame assembly 302, as shown, an area R is created between the tire support members 302d and one of the cross bars 302b. When a crate is assembled in accordance with this embodiment, the tires of one end of a vehicle, such as an ATV, are supported within area R.

In addition to providing a middle frame portion with a saddle portion for supporting cargo at an angle, the embodiment described, for example, with reference to FIGS. 8-13 is also constructed to include the telescoping feture described in regard to the other embodiments. In particular, as mentioned above, the corner portions 301c of the top frame portion While various aspects of the present invention have been particularly shown and described with reference to the exemplary, non-limiting, embodiments above, it will be understood by those skilled in the art that various additional aspects and embodiments may be contemplated without departing from the spirit and scope of the present invention. For example, a skilled artisan would understand that various materials can be used to construct the shipping crate disclosed as can various dimensions and configurations. Also, even though the embodiments described above disclose a telescoping leg-corner configuration and a corner-corner configuration, where the upper-most component (e.g., top corner portion) fits into the middle component (e.g., leg), which in turn fits into the lower-most component (e.g., bottom corner portion), a skilled artisan would understand that the order can be reversed, i.e., the lower-most component could fit into the middle component, which in turn could fit into the upper-most component. It would be understood that a device or method incorporating any of the additional or alternative details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. A crate comprising:
   a rectangular top frame comprising two parallel top length bars, two parallel top cross bars, and four top corner portions, each top corner portion fixedly attached to a top length bar and a top cross bar at a corner of the top frame and extending downwardly from the top frame;
   a rectangular middle frame comprising two parallel length bars, two parallel end pieces, and four middle corner portions;
   a tire saddle assembly connected to the middle frame portion between the two parallel length bars;
   a rectangular bottom frame comprising two parallel bottom length bars, two parallel bottom cross bars, and four bottom corner portions, each bottom corner portion fixedly attached to a bottom length bar and a bottom cross bar at a corner of the bottom frame and extending upwardly from the bottom frame;
   four top leg portions, wherein each top leg portion telescopically engages the corner portions of the top frame and the middle frame;
   four bottom leg portions, wherein each bottom leg portion telescopically engages the corner portions of the bottom frame and the middle frame,
   wherein the tire saddle assembly is operable to support the front or rear tires of a vehicle while the opposite set of tires is supported by the bottom frame, such that the vehicle is at an angle relative to the top frame and the bottom frame.

2. A crate as claimed in claim 1, wherein the tire saddle assembly comprises two end pieces between which are connected two tire support members.

3. A crate as claimed in claim 2, wherein the two tire support members have an inverted L-shape and are spaced apart to form an area into which tires are supported.

4. A crate as claimed in claim 3, wherein an angle formed with respect to the tire support members and attachment portions attached to the end pieces is approximately 40 degrees.

5. A method of using the crate of claim 1, comprising:
   placing a vehicle within the crate, wherein the front or rear tires of the vehicle are placed in the tire saddle assembly and the opposite set of tires is supported by the bottom frame.

6. A method as claimed in claim 5, wherein the vehicle is at an angle of at least 10 degrees with respect to the top, middle, and bottom frame portions.

* * * * *